(No Model.) 3 Sheets—Sheet 1.

W. VENULETH.
APPARATUS FOR MAKING FERTILIZERS.

No. 584,908. Patented June 22, 1897.

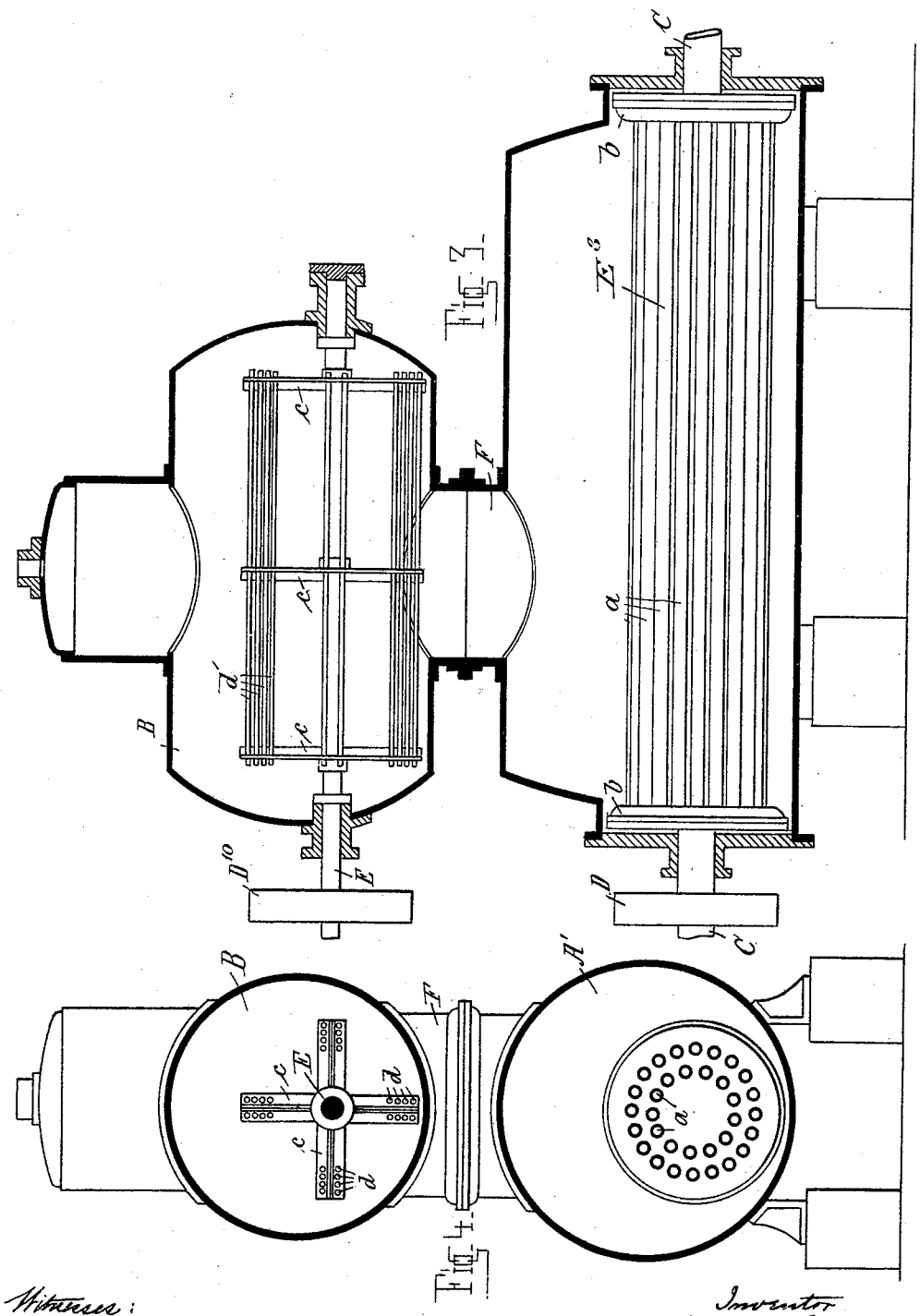

(No Model.)　　　　　　　　　　　　　　　　3 Sheets—Sheet 3.
W. VENULETH.
APPARATUS FOR MAKING FERTILIZERS.

No. 584,908.　　　　　　　　Patented June 22, 1897.

UNITED STATES PATENT OFFICE.

WILHELM VENULETH, OF DARMSTADT, GERMANY, ASSIGNOR TO THE ACTIEN-MASCHINENBAU-ANSTALT, VORMALS VENULETH & ELLENBERGER, OF SAME PLACE.

APPARATUS FOR MAKING FERTILIZERS.

SPECIFICATION forming part of Letters Patent No. 584,908, dated June 22, 1897.

Application filed January 17, 1895. Serial No. 535,238. (No model.)

*To all whom it may concern:*

Be it known that I, WILHELM VENULETH, manufacturer, of Darmstadt, Germany, have invented new and useful Improvements in Apparatus for Drying Fecal Matter, of which the following is a specification.

In the processes hitherto employed for the treatment of fecal matter either the ammonia was obtained by direct distillation and the solid constituents were not further utilized or these latter were dried and the ammonia was left unutilized. The only process for recovering both constituents of which I am aware consisted in treating the liquid matter with acid before being dried in order to fix the ammonia. The yield of ammonia was, however, in this case deficient, although it was necessary to work with an excess of acid, which attacked the vessels.

This invention has for its object to provide an apparatus for the simultaneous recovery of both constituents by means of a continuous mode of treatment; and to this end my invention consists in the apparatus hereinafter described and claimed.

Figure 1:
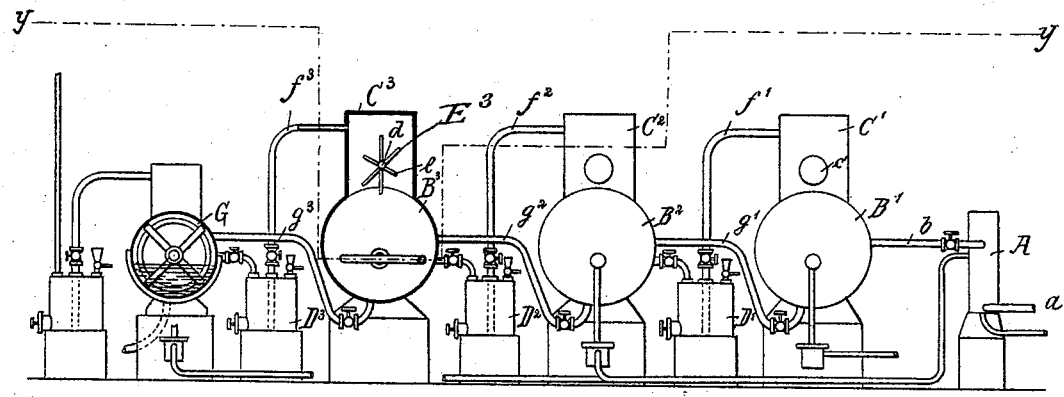
Figure 2:
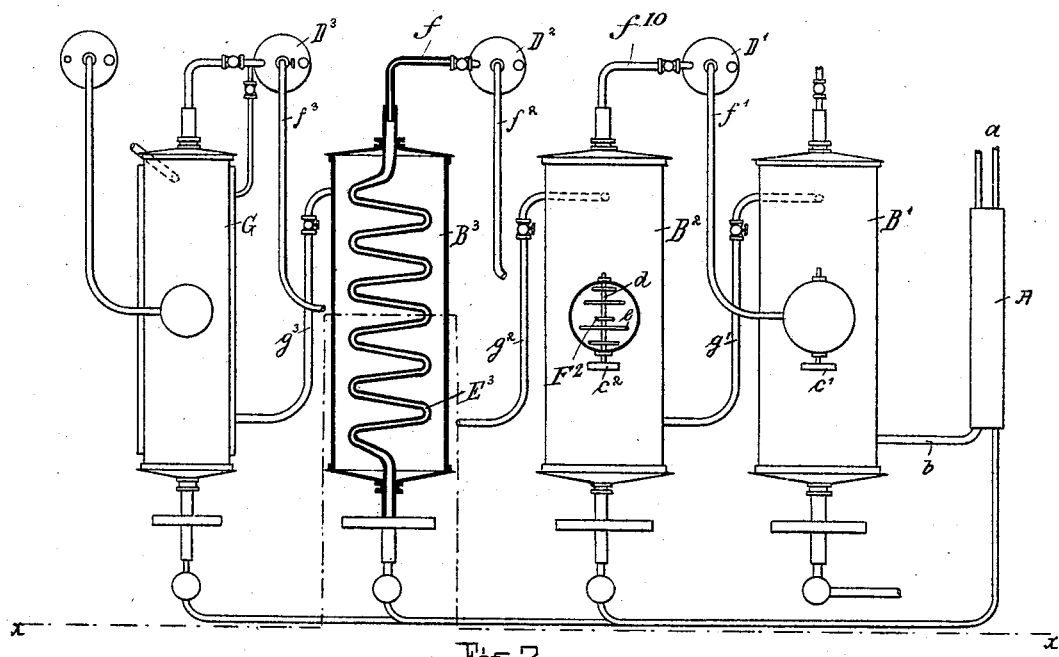
Figure 5:
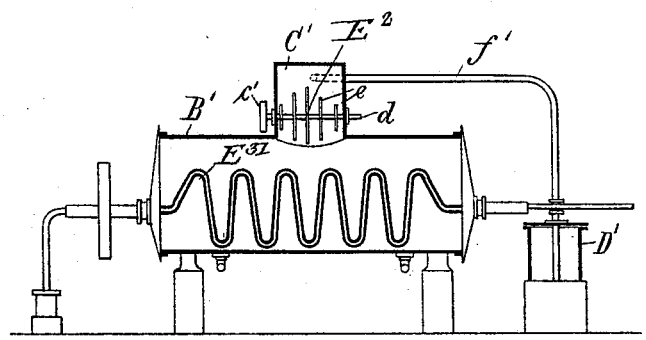

In the accompanying drawings, forming part hereof, Figure 1 is an elevation, partly in section, of one form of apparatus made in accordance with my invention, the said section being taken on the line $x\,x$ of Fig. 2, which is a plan view, partly in section, of the apparatus shown in Fig. 1, the section being taken on the line $y\,y$ of Fig. 1. Figs. 3 and 4 are two vertical sections, on a larger scale and taken at right angles to each other, of a fecal-matter-treating boiler and a froth-destroying apparatus embodying my invention. Fig. 5 is a central longitudinal section through the evaporator B'.

I will now describe the construction and operation of my apparatus.

The fecal matter enters at $a$ into a preliminary heater A, (see Fig. 1,) which is preferably heated by the waste vapor from a suitable drying apparatus and reaches the first evaporator B' of the series of evaporators B' B² B³ by means of the pipe $b$. These evaporators are alike in construction, and the evaporator B' is directly heated by steam from any suitable source of supply, (not shown,) and is further provided with an agitating or stirring device E³ or E³¹, preferably of one of the forms shown in Figs. 3 and 5, for preventing the setting of the drying substances. In this evaporator steam and ammoniacal vapor are freely developed and a viscous extremely-voluminous froth is formed, which soon fills the whole vessel. This froth is broken up by means of any suitable rapidly-revolving froth-beating device E², placed in the upper part of dome C' of the evaporating vessel, the wings $e$ of this device beating and thus destroying the separate bubbles of froth. This froth-breaking device in the present instance is shown as consisting of a shaft $d$, rapidly revolved by means of a belt-pulley $c'$, Fig. 5, on which shaft wings or beaters $e$ are attached which traverse the froth and by beating the same destroy it. The vapor thus purified then passes through a pipe $f'$ into the sulfuric-acid-containing vessel D', in which the ammonia is retained and from which it is removed from time to time. The steam, now free from any admixture, then passes by the pipe $f^{10}$ into the heating apparatus of the evaporator B². A somewhat lower degree of heat is maintained in this evaporator B² than is maintained in the first evaporator B' and therefore the pressure is less. It is consequently possible to force the concentrated contents of the first evaporator B', by means of the pressure existing therein, through the pipe $g'$ into the second evaporator.

I have described in detail the construction and operation of but one evaporator, it being understood that all the evaporators of the series are preferably of the same construction and operation. Thus the concentrated contents of the evaporator B² pass into the evaporator B³ by the pipe $g^2$, the ammonia passing into the sulfuric-acid-containing vessel D² by the pipe $f^2$, and thence the steam passes into the evaporator B³ by the pipe $f$. The third evaporator B³ discharges, by reason of the pressure existing in it, a very concentrated liquid mass through the pipe $g^3$ into a suitable drying apparatus G, where its further treatment takes place by direct heat, currents of air, or other suitable means. The ammonia is by this time entirely removed and the steam passes into the vessel D³ by the pipe f³, whence the residual vapor is discharged into the drier G. Open vessels may be used for this purpose. The apparatus for destroying the froth may, if desired, be omitted in the last vessel. It may be preferable in some cases to recover the ammonia first from the collected sewage-water.

Figs. 3 and 4 show a form of evaporating apparatus in which the vapor rising from the feces first passes through a beating mechanism which is provided with bars, beaters, or the like, which occupy the entire width of the steam-passage, so that the steam or vapor must necessarily pass between them. The bubbles of froth are thus broken by encountering these bars. In these figures A' represents a boiler in which the steam-pipes $a'$, arranged in the heads $b'$, rotate on the spindle C, which also serves as the steam-supply. The vapor rises with the froth through the conduit or trunk F into the boiler B. In this boiler is arranged a series of bars $d'$, mounted on a shaft E, which is adapted to be rapidly rotated, as by means of a pulley $D^{10}$, the said bars being held in end supports $c\ c$. The vapor or steam must pass between this assemblage of bars which constitute the beater.

The vessel in which the vapor is treated with sulfuric acid must of course be provided with a discharging-aperture in order to allow the sulfate of ammonia formed to be removed continuously or from time to time. This discharging-aperture is not shown.

It is thought from the foregoing description that the process followed will be readily understood, but may be briefly described, without reference to the particular means herein described, to be as follows: The fecal matter is evaporated in a boiler by means of steam heating at a high temperature and under constant agitation. The vapor arising therefrom, in which the ammonia is also contained, is freed from froth by vigorous beating, the separate froth-bubbles being broken and the slimy skin and solid matter which form them sinking back into the mass. The vapor is then passed through a vessel containing sulfuric or other suitable acid, in order to retain the ammonia, and reaches a second vessel similar to the first heating vessel, in which it serves as a heating medium. The mass previously treated in the first vessel is conveyed into this second vessel by means of the higher pressure which naturally exists in the former. This operation is repeated until all the ammonia has been given off and the liquid matter remaining has reached such a degree of concentration that it may be conveyed actually by the pressure to which it is exposed in the last vessel directly into an open apparatus for further drying in the usual manner.

Now what I claim, and desire to secure by Letters Patent, is the following:

1. In an apparatus for the treatment of fecal matter, the combination of a vessel for drying the fecal matter, a rotary stirrer or beater contained therein and consisting of steam-pipes $a'\ a'$, heads $b'\ b'$, and a tubular shaft C carrying the said pipes, a second vessel mounted upon the first vessel, a conduit F forming the communication between the vessels, and a beater contained in the last-named vessel for breaking up the froth and vapors which may be evolved.

2. In an apparatus for treating liquid fecal matter, the combination of a vessel for drying the fecal matter, a rotary stirrer or beater contained therein, a second vessel mounted upon the first vessel, a conduit F forming the communication between the vessels, and a beater contained in the last-named vessel combined with a second drying vessel, a pipe leading from the first drying vessel into the second drying vessel, said pipe conducting steam from the first drying vessel into the second drying vessel, a steam-pipe contained within the second drying vessel communicating with the pipe connecting the vessels, and another connection between the vessels for conveying fecal matter from one vessel to the other, whereby the liquid fecal matter may be partially dried in one vessel, the liquid products removed therefrom in a gaseous form, and the fecal matter transferred to another drying vessel for the purpose of further drying the fecal matter.

In testimony whereof I have signed my name to this specification in the presence of two subscribing witnesses.

WILHELM VENULETH.

Witnesses:
 RICHARD WIRTH,
 CARL ROTZ.